(12) United States Patent
Moad et al.

(10) Patent No.: US 8,283,436 B2
(45) Date of Patent: Oct. 9, 2012

(54) PROCESS FOR SYNTHESIZING THIOL TERMINATED POLYMERS

(75) Inventors: Graeme Moad, Victoria (AU); Ezio Rizzardo, Victoria (AU); San Hoa Thang, Victoria (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 517 days.

(21) Appl. No.: 11/710,305

(22) Filed: Feb. 23, 2007

(65) Prior Publication Data

US 2007/0232783 A1   Oct. 4, 2007

Related U.S. Application Data

(60) Provisional application No. 60/776,044, filed on Feb. 23, 2006.

(51) Int. Cl.
*C08F 6/00* (2006.01)
(52) U.S. Cl. ......................................... 528/480; 528/373
(58) Field of Classification Search ................... 528/480
See application file for complete search history.

(56) References Cited

U.S. PATENT DOCUMENTS

| | | | | |
|---|---|---|---|---|
| 6,479,153 | B1 * | 11/2002 | Kato et al. | 428/423.7 |
| 2003/0199653 | A1 * | 10/2003 | McCormick et al. | 526/219.6 |
| 2004/0171765 | A1 | 9/2004 | Tsuji et al. | |
| 2004/0249026 | A1 * | 12/2004 | Tsuji et al. | 524/81 |

OTHER PUBLICATIONS

Derek et al. (Macromolecules 2005, 38, 8597-8602).*

* cited by examiner

*Primary Examiner* — Shane Fang
(74) *Attorney, Agent, or Firm* — Arent Fox LLP

(57) ABSTRACT

The present invention is directed to a process for the cleavage of one or more starting polymers having thiocarbonylthio groups of the formula —S—(C=S)— into derived polymers having thiol end groups of the formula —SH. The process includes contacting the aforedescribed starting polymers, with a reagent having the formula $X_a\sim\sim\sim Y_b$, wherein $X_a$ is a nucleophilic group and $Y_b$ is an extracting group that results in the starting polymer and a byproduct, which is then separated from the derived polymer by conventional separation processes. The derived polymer is free from any odor or color that is sometimes associated with the starting polymer and it can be used in making optical lenses, such as contact lenses.

19 Claims, No Drawings

PROCESS FOR SYNTHESIZING THIOL TERMINATED POLYMERS

CROSS-REFERENCE TO RELATED APPLICATION

This application claims priority under 35 U.S.C. §119 from U.S. Provisional Application Ser. No. 60/776,044, filed Feb. 23, 2006.

FIELD OF INVENTION

This invention relates to the transformation of polymers formed by RAFT polymerization and other polymers containing thiocarbonylthio groups of the formula —S—(C=S)—. More particularly it provides a process for the synthesis of polymeric thiols.

BACKGROUND OF INVENTION

Polymers containing thiocarbonylthio groups can be colored, the color depending on the absorption spectrum of the thiocarbonylthio chromophore. Such polymers can also be odorous or release an odor over time due to decomposition of the thiocarbonylthio groups. The presence of such color and odor can be disadvantageous. In some circumstances, it may also be necessary to deactivate thiocarbonylthio groups because of their reactivity or to transform them for use in subsequent processing into conventional applications, such as coating compositions.

For certain applications, it is desirable to have polymers possessing thiol functionality. These applications include the use of bis- or multithiols in the synthesis of condensation polymers such as polythiourethanes and polythioesters or polymers containing disulfide linkages. Polymeric thiols can also be used as transfer agents in free radical polymerization to form block or segmented copolymers.

Thiol functionality can also be used to form crosslinks in network polymers and microgels and to form conjugates to biological polymers, such as proteins.

Other applications of thiol-functional polymers relate to the property of thiols to complex metals, such as gold and cadmium. Thus, it is possible to use thiol-functional polymers to form nanoparticles encapsulating these metals. It is also possible to use such polymers as metal sequestering agents.

It is well known that thiocarbonylthio groups can be transformed into thiols by reaction with certain nucleophiles which include primary and secondary amines, ammonia, other thiols, and hydroxide. They can also be reduced to thiols with reducing agents such as sodium borohydride, lithium aluminum hydride or zinc in acetic acid. These and similar reactions of thiocarbonylthio groups in small molecules are reviewed by Kato and Ischida in Sulfur Reports, 1988, 8, 155 and by Mayer and Scheithauer in Houben-Weyl Methods of Organic Chemistry, volume E, p 891 (1985). Examples of aminolysis of a thiocarbonylthio group from a polymer to leave thiol functionality are provided in Makromol. Chem. 1982, 182, 2383.

Polymers formed by RAFT polymerization contain thiocarbonylthio groups either at the chain ends or within the chain. In WO9801478A1, in which RAFT polymerization using thiocarbonylthio transfer agents is first disclosed by Le et al., it is also disclosed that polymers formed by RAFT polymerization are susceptible to this chemistry. The potential of this chemistry to cleave end groups and decolorize polymers and produce a polymer with a thiol end group is cited in by Chiefari et al. in Macromolecules 1998, 31, 5559.

In Macromolecules 2000, 33, 244, it is demonstrated that the poly(methyl acrylate) prepared with a trithiocarbonate RAFT agent can be cleanly cleaved by treatment with ethylenediamine.

Application US20040171765A1 assigned to Kaneka Corporation claims treatment of a polymer with thiocarbonylthio chain ends with a compound selected from ammonia, hydrazine, primary amine compounds, and secondary amine compounds to form a polymer with thiol chain ends which is used as a precursor to a polythiourethane. The treatment agent was preferred to be low boiling (<100°), for example, ethylamine, or a hindered amine light stabilizer.

U.S. Pat. No. 6,794,486 assigned to Rhodia discloses the treatment of a polymer with a dithio group at the chain end with an amine not triethanolamine in an organic solvent to decolorize the polymer and remove end groups. The example amine provided is ammonium hydroxide. It is also suggested that many amine compounds can react with functionality in the polymers such as poly(acrylate esters) and poly(vinyl acetate) to give undesired side products. The process is not specifically directed to the synthesis of polymeric thiols and the end groups formed by removal of the dithio end group are not defined.

The by-products formed by cleaving a thiocarbonylthio end group to form a thiol end group by the processes described can themselves be colored or odorous. They may also interfere with subsequent processing steps or the intended application. They can also be difficult to separate from the polymer. Thus a new process is required which cleanly produces thiol groups from a starting polymer with thiocarbonylthio end groups and which provides byproducts which can be conveniently separated from the derived polymer.

STATEMENT OF INVENTION

The present invention is directed to a process for removing one or more groups of the formula —S—(C=S)— from a starting polymer, which is in the form of a solution, dispersion, or a combination thereof, said process comprising:

contacting said starting polymer with one or more reagents having the formula $X_a$∼∼∼$Y_b$, to produce a derived polymer having one or more groups of the formula HS— and a byproduct containing $Y_b$, wherein $X_a$ is one or more nucleophilic groups and $Y_b$ is an extracting group and wherein said a ranges from 1 to 30 and said b is 1 or 2; and separating said byproduct from said derived polymer.

DETAILED DESCRIPTION OF THE PREFERRED EMBODIMENT

As defined herein:

"Living polymerization" means a process which proceeds by a mechanism whereby most chains continue to grow throughout the polymerization and where further addition of monomer results in continued polymerization (block copolymers can be prepared by sequential monomer addition of different monomers). The molecular weight is controlled by the stoichiometry of the reaction and narrow molecular weight distribution polymers can be produced.

"RAFT polymerization" means a radical polymerization carried out in the presence of a reversible addition-fragmentation transfer (RAFT) agent which shows the characteristics of living polymerization.

"RAFT agent" means a chain transfer agent used in RAFT polymerization that reacts by an addition fragmentation mechanism.

"Addition-fragmentation" is a two-step chain transfer mechanism wherein a radical addition is followed by fragmentation to generate a new radical species that reinitiates polymerization.

"Radical leaving group" means a group attached by a bond capable of undergoing homolytic scission during a reaction to thereby form a free radical.

"Stoichiometric amount" means a molar equivalent amount of reagent used to reduce each —S—(C=S)— group disposed on a starting polymer chain. Thus, for example, a stoichiometric amount of a reagent used for a starting polymer chain having a single —S—(C=S)— group would be at a 1:1 molar ratio with respect to the starting polymer and a stoichiometric amount of a reagent used for a starting polymer chain having a two —S—(C=S)— groups would be at a 2:1 molar ratio with respect to the starting polymer.

"Chain transfer constant" means the ratio of the rate constant for chain transfer to the rate constant for propagation at zero conversion of monomer and RAFT agent. If chain transfer occurs by addition-fragmentation, the rate constant for chain transfer (ktr) is defined as follows:

$$k_{tr} = k_{add} \times \frac{k_\beta}{k_{-add} + k_\beta}$$

where $k_{add}$ is the rate constant for addition to the RAFT agent and $k_{add}$ and $k\beta$ are the rate constants for fragmentation in the reverse and forward directions respectively.

"GPC number average molecular weight" ($M_n$) means a number average molecular weight and "GPC weight average molecular weight" ($M_w$) means a weight average molecular weight measured by utilizing gel permeation chromatography (GPC). A Waters Associates liquid chromatograph equipped with differential refractometer was used. Tetrahydrofuran (flow rate of 1.0 mL/min) was used as an eluent. The molecular weights were provided as polystyrene equivalents.

"Polydispersity" ($M_w/M_n$) means GPC weight average molecular weight divided by GPC number average molecular weight. The lower the polydispersity, the narrower the molecular weight distribution.

"Cyclopolymerizable monomers" means compounds which contain two or more unsaturated linkages suitably disposed to allow propagation by a sequence of intramolecular and intermolecular addition steps leading the incorporation of cyclic units into the polymer backbone. Most compounds of this class are 1,6-dienes such as—diallylammonium salts (e.g., diallyidimethylammonium chloride), substituted 1,6-heptadienes (e.g., 6-dicyano-1,6-heptadiene, 2,4,4,6-tetrakis(ethoxycarbonyl)-1,6-heptadiene) and monomers of the following generic structure:

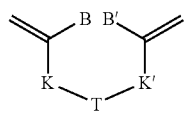

where substituents K, K', T, B, B' are chosen such that the monomer undergoes cyclopolymerization. For example:
B, B' are independently selected from the group consisting of H, $CH_3$, CN, $CO_2$Alkyl, Ph; K, K' are selected from the group consisting of $CH_2$, C=O, $Si(CH_3)_2$, O; T is selected from the group consisting of $C(E)_2$, O, $N(Alkyl)_2$ salts, $P(Alkyl)_2$ salts, P(O)Alkyl. Additional monomers listed in Moad and Solomon, "The Chemistry of Radical Polymerization", Elsevier, Oxford, 2006, pp 185-194, are also suitable.

"Ring opening monomers" are monomers which contain a suitably disposed carbocyclic or heterocyclic ring to allow propagation by a sequence of intermolecular addition and intramolecular ring opening steps such as those described in Moad and Solomon, "The Chemistry of Radical Polymerization", Elsevier, Oxford, 2006, pp 194-208.

"Organometallic species" means a moiety containing one or more metal atoms from Groups III and IV of the Periodic Table and transition elements and organic ligands, preferably species, such as, $Si(X_a)^3$, $Ge(X_a)3$ and $Sn(X_a)3$ which provide radical leaving groups and initiate polymerization, $X_a$ being a group discussed later in the specification.

"Heterocyclic" or "heterocyclyl" means a ring structure containing 3 to 18 atoms at least one of which is selected from O, N and S, which may or may not be aromatic. Examples of "heterocyclyl" moieties are pyridyl, furanyl, thienyl, piperidinyl, pyrrolidinyl, pyrazoyl, benzthiazolyl, indolyl, benzofuranyl, benzothiophenyl, pyrazinyl, and quinolyl, optionally substituted with one or more of alkyl, haloalkyl and halo groups.

"Substituent functionality derived from a substituted or unsubstituted heterocycle attached via a nitrogen atom" means the group formed by excising a monovalent nitrogen (e.g. >NH) from an appropriate nitrogen containing heterocycle. Said heterocycles include pyrrolidine, pyrrole, indole, imidazole, carbazole, benzimidazole, benzotriazole, piperidine and isatin, all of which can be substituted or unsubstituted. For example, in the case of pyrrole, the substituent functionality is 1,3-butadiene-1,4-diyl, and in the case of pyrrolidine it is butane-1,4-diyl.

Unless specified otherwise, alkyl groups referred to in this specification can be branched or unbranched and contain from 1 to 18 carbon atoms. Alkenyl groups can be branched or unbranched and contain from 2 to 18 carbon atoms. Saturated or unsaturated or carbocyclic or heterocyclic rings can contain from 3 to 18 atoms. Aromatic carbocyclic or heterocyclic rings can contain 5 to 18 atoms.

"Random copolymer" is a copolymer consisting of macromolecules in which the probability of finding a given monomeric unit at any given site in the chain is independent of the nature of the adjacent units.

"Statistical copolymer" is a copolymer consisting of macromolecules in which the sequential distribution of the monomeric units obeys known statistical laws. An example of a statistical copolymer is one consisting of macromolecules in which the sequential distribution of monomeric units follows Markovian statistics.

"Microgel" means a polymeric network of microscopic dimensions of 0.01 to 100 microns.

"Ion exchange" means adsorbing of one or several ionic species accompanied by the simultaneous desorbing (displacement) of an equivalent amount of one or more other ionic species. In such a process, ions are exchanged between a solution and an ion exchanger, such as a conventional ion exchange resin.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including every value between the minimum and maximum values, including the minimum and maximum end points of the range.

The present invention is directed to a process for removing one or more groups of the formula —S—(C=S)— from a starting polymer, which can be in the form of a solution, dispersion, or a combination thereof. By removing the groups of the formula —S—(C=S)— from the starting polymer the odors and any color that can be associated with the starting polymers is substantially minimized or eliminated.

The starting polymers suitable for the process of the present invention are produced by free radical polymerizing a monomer mixture in the presence of one or more free radical initiators and one or more sulfur based chain transfer agents that are also known as RAFT agents. However, starting polymers made by other processes besides those utilizing the RAFT agents can also be employed in the present invention. The starting polymer can be a starting homopolymer, starting random, statistical, alternating or gradient copolymer, starting block polymer, starting star polymer, starting graft copolymer, starting dendritic or hyperbranched copolymer, starting microgel, or a combination thereof. The term "hyperbranched" means a polymer structure that includes branches-upon-branches type polymer architecture.

The monomer mixture can include at least one vinyl monomer having the formula:

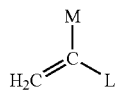

where L is selected from the group consisting of hydrogen, halogen, and substituted or unsubstituted $C_1$-$C_4$ alkyl; and where M is selected from the group consisting of hydrogen, R''', $CO_2H$, $CO_2R'''$, COR''', CN, $CONH_2$, $PO(OR''')_3$, CONHR''', $CONR'''_2$, $O_2CR'''$, OR''', and halogen, wherein R''' is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl; said substituents being independently selected from the group consisting of hydroxy, OR''', $CO_2H$, $O_2CR'''$, $CO_2R'''$, $C_1$-$C_{22}$ alkyl, $C_6$-$C_{18}$ aryl, =O (oxo), $C_6$-$C_{18}$ acyl, $SO_3H$, sulfonate, cyano, $C_3$-$C_{66}$ trialkoxysilyl, $C_3$-$C_{66}$ trialkylsilyl, halo, $C_2$-$C_{44}$ dialkylamino, amido and a combination thereof.

The specific monomers or comonomers in the monomer mixture can include one or more of the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), methyl α-hydroxymethyacrylate, ethyl α-hydroxymethyacrylate, butyl α-hydroxymethyacrylate, N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers). p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilyipropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, isoprene, chloroprene, ethylene and propylene.

The monomer mixture can include maleic anhydride, N-alkylmaleimide, N-arylmaleimide, dialkyl fumarate, a cyclopolymerizable monomer, a ring opening monomer, a macromonomer or a combination thereof. Alternatively, the monomer mixture can include aforestated monomers along with at least one of the aforedescribed vinyl monomers.

Other suitable monomers in the monomer mixture can include cyclopolymerizable monomers such as those disclosed in U.S. Pat. No. 5,830,966 or in Moad and Solomon, "The Chemistry of Radical Polymerization", Elsevier, Oxford, 2006, pp 185-194, and ring opening monomers such as those described in Moad and Solomon, "The Chemistry of Radical Polymerization", Elsevier, Oxford, 2006, pp 194-208, both of which are incorporated herein by reference.

The RAFT agent suitable for use in the foregoing process can include those of the following formulae:

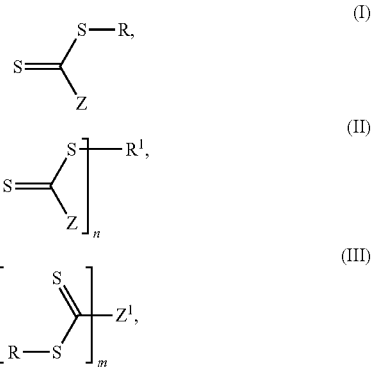

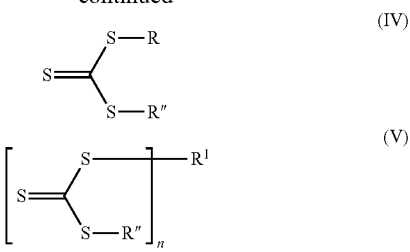

or a combination thereof;
wherein R and $R^1$ are free radical leaving groups; and wherein, R is selected from the group consisting of unsubstituted or substituted alkyl, unsubstituted or substituted alkenyl, unsubstituted or substituted $C_2$ to $C_{18}$ alkynyl, $C_3$ to $C_{22}$ substituted or unsubstituted cycloalkyl, $C_4$ to $C_{22}$ substituted or unsubstituted cycloalkenyl, $C_6$ to $C_{18}$ unsubstituted or substituted aryl, unsubstituted or substituted saturated heterocyclic ring, $C_5$ to $C_{18}$ unsubstituted or substituted unsaturated heterocyclic ring, $C_4$ to $C_{18}$ unsubstituted or substituted aromatic heterocyclic ring, $C_1$ to $C_{18}$ unsubstituted or substituted alkylthio group, and a first polymer chain having a number average degree of polymerization in the range of 5 to 1000;

wherein R" is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl;

Z is selected from the group consisting of H, chloro, fluoro, unsubstituted or substituted alkyl, $C_6$ to $C_{18}$ unsubstituted or substituted aryl, unsubstituted or substituted heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, cyano, $C_2$ to $C_{18}$ dialkyl-phosphonato, diaryl-phosphonato, $C_1$ to $C_{18}$ dialkyl-phosphinato, diaryl-phosphinato, $C_1$-$C_{22}$ trialkoxysilyl, $C_1$-$C_{22}$ trialkylsilyl and a second polymer chain having a number average degree of polymerization in the range of 5 to 1000;

$R^1$ is an n-valent moiety derived from R;

$Z^1$ is an m-valent moiety derived from a species selected from the group consisting of unsubstituted or substituted alkyl, unsubstituted or substituted aryl and a third polymer chain having a number average degree of polymerization in the range of 5 to 1000 wherein the connecting moieties in said polymer chain are selected from the group consisting of $C_1$ to $C_{18}$ aliphatic carbon, aromatic carbon, oxygen, sulfur and a combination thereof;

n and m are integers that interpedently range from 1 to 50, preferably from 1 to 6; and wherein the substituents for the substituted groups for R, $R^1$, R", Z and $Z^1$ are independently selected from the group consisting of hydroxy, tertiary amino, halo, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

By a "polymer chain" referred to above for R, $R^1$, Z, and $Z^1$ is meant conventional condensation polymers, such as polyesters [for example, polycaprolactone, poly(ethylene terephthalate), poly(lactic acid)], polycarbonates, poly(alkylene oxide)s [for example, poly(ethylene oxide), poly(tetramethylene oxide)], nylons, polyurethanes or chain polymers such as those formed by coordination polymerization (for example polyethylene, polypropylene), radical polymerization (for example, poly(meth)acrylates and polystyrenics, anionic polymerization (for example, polystyrene, polybutadiene), cationic polymerization (for example, polyisobutylene) and group transfer polymerization (for example, poly(meth)acrylates).

The groups R, $R^1$, Z and $Z^1$ are chosen so as to be appropriate for use with the desired monomers or monomer combination and the RAFT polymerization method as disclosed in International Patent Publications WO 98/01478, WO 99/05099, WO 99/31144, and WO01/77198, all of which are incorporated herein by reference.

The RAFT agents suitable for use in the polymerization have a chain transfer constants in the range of from 0.1 to 5000, preferably in the range of from 1 to 2000 and more preferably in the range of from 10 to 500. If the chain transfer constant of the RAFT agent exceeds the upper limit of the range substantially no polymerization occurs. If it falls below the lower limit, starting polymers having low polydispersity (generally ranging from 1.04 to 1.4) may not result. The RAFT agents of the present invention generally should not copolymerize with monomers during the polymerization process. As a result, low polydispersity starting polymers based on monosubstituted monomers (e.g., acrylic monomers, styrene) can be made under a wide range of reaction conditions.

Suitable RAFT agents for are also described on pages 502-517 in *The Chemistry of Radical Polymerization*, by Moad and Solomon, which was published by Oxford, London in 2006.

The synthesis of starting polymer by RAFT polymerization can be carried out in emulsion, solution or suspension in either a batch, semi-batch, continuous, or in a feed mode. For lowest polydispersity (generally ranging from 1.04 to 1.4) starting polymers, the RAFT agent is typically added before polymerization is commenced. For example, when carried out in a batch mode in solution, the reactor is typically charged with a RAFT agent and a monomer, or a polymerization medium plus the monomer. Starting polymers with broader, yet controlled, polydispersity (generally ranging from 1.4 to 2.0) or with multimodal molecular weight distribution (generally ranging from 1.2 to 8.0) can be produced by controlled addition of the RAFT agent over the course of the polymerization process.

In the case of emulsion or suspension polymerization, the polymerization medium will often be predominantly water and the conventional stabilizers, dispersants and other additives can be present.

For solution polymerization, the polymerization medium can be chosen from a wide range of media to suit the monomer(s) being used. For example, aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as, propylene glycol monomethyl ether acetate.

The use of feed polymerization conditions allows the use of RAFT agents with lower chain transfer constants (generally ranging from 0.1 to 1.0) and allows the synthesis of starting polymers that are not readily achieved using batch polymerization processes. If the RAFT polymerization is carried out as a feed system, the reaction can be carried out in the following manner:

The reactor is charged with the chosen polymerization medium, the RAFT agent and optionally a portion of the monomer mixture. Into a separate vessel is placed the remaining monomer mixture. The free radical initiator is dissolved or suspended in polymerization medium in another separate vessel. The medium in the reactor is heated and stirred while the monomer mixture plus the medium and the initiator plus the medium, is introduced, for example by a syringe pump or other pumping device. The rate and duration of feed is largely determined by the quantity of the solution, the desired monomer/RAFT agent/initiator ratio and the rate of the polymerization. When the feed is complete, heating can be continued for an additional period. Following the completion of the polymerization, the starting polymer can be isolated by stripping off from the polymerization medium and/or unreacted monomer(s) or by precipitation with a non-solvent. Alternatively, the solution/emulsion of starting polymers in the polymerization medium can be used as such, if appropriate to its application.

Starting block and starting multi-block and starting gradient copolymers can be prepared by varying the rate of monomer(s) addition and/or by varying the sequence in which the monomer(s) can be added to the polymerization medium. Starting di-block (A-B) and starting tri-block (A-B-A, A-B-C and their permutations) copolymers are preferred. Starting gradient block polymer can be also prepared in a one-step process by making use of the inherent difference in reactivity of the monomer(s). For starting gradient block copolymers, it is often desirable to pick comonomers with disparate reactivity ratios. For example, maleic anhydride and styrene or (meth)acrylates.

By appropriate selection of the groups R, $R^1$, Z, and $Z^1$ in the RAFT chain transfer agent of formulae I-III above, starting block copolymers with specific functionalities can be readily produced. Starting block copolymer can be prepared by starting with an existent polymer chain prepared by means other than RAFT polymerization and then modifying the end or other functionality such that the polymer chain is incorporated in a compound of formulae I-III so as to create a macromolecular RAFT agent that can be chain extended by RAFT polymerization. The GPC number average molecular weight of the starting polymers ranges from 200 to 1,000,000 preferably from 500 to 100,000. The polydispersity of the starting polymers ranges from 1.04 to 10 preferably from 1.05 to 3.

The free radical initiators suitable for use in the present invention include those compounds that provide initiating radicals that add to monomers to produce propagating radicals. The amount of initiator used depends upon the desired polydispersity, molecular weight and polymer structure of the resulting polymer. However, generally less than 10 weight percent based on the total amount of monomer mix is used. Preferably the amount of initiator used is in the range of 0.001 to 5.0 weight percent based on the total amount of monomer mix.

The source of initiating radicals includes such sources as the thermally induced homolytic scission of suitable initiators, such as peroxides, peroxyesters, or azo compounds; the spontaneous generation from a monomer, such as styrene; redox initiating systems; photochemical initiating systems or high energy radiation source, such as electron beam, X- or γ-radiation or a combination of these methods. The initiating system is chosen such that under the reaction conditions there is substantially no adverse interaction of the initiator or the initiating radicals with the RAFT agent under the reaction conditions. The initiator should also have the requisite solubility in the polymerization medium or the monomer mixture.

Examples of suitable sources of free radicals for the process of the present invention include azo compounds and peroxides, such as:

2,2'-azobis(isobutyronitrile), 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-N-(1,1)-bis(hydoxymethyl)-2-hydroxyethyl]propionamide, 2,2'-azobis[2-methyl-N-hydroxyethyl)]-propionamide, 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, or dicumyl hyponitrite.

Photochemical initiator systems are chosen to have the requisite solubility in the reaction medium or monomer mixture and have an appropriate quantum yield for radical production under the conditions of the polymerization. Examples include benzoin derivatives, benzophenone, acyl phosphine oxides, and photo-redox systems. Free radicals can also be derived by direct photolysis of the compound of formula I-III.

Redox initiator systems are chosen to have the requisite solubility in the reaction medium or monomer mixture and have an appropriate rate of radical production under the conditions of the polymerization; these initiating systems can include combinations of the following oxidants and reductants.

Oxidants: potassium peroxydisulfate, hydrogen peroxide, and t-butyl hydroperoxide.

Reductants: iron (II), titanium (III), potassium thiosulfite, and potassium bisulfite.

Other suitable initiating systems are described in recent texts, such as, for example, in pages 79-111 in *The Chemistry of Radical Polymerization*, by Moad and Solomon, which was published by Oxford, London in 2006.

The polymerization process according to the present invention is generally performed under the conditions typical of conventional free-radical polymerization. Polymerization employing the RAFT agents of the present invention is suitably carried out with temperatures during the reaction in the range −20° C. to 200° C., preferably in the range 40° C. to 160° C.

The process of the present invention includes contacting the at least one of the aforedescribed starting polymers, preferably with at least a stoichiometric amount of one or more reagents having the formula $X_a \sim\sim\sim Y_b$, to produce one or more derived polymers having one or more groups of the formula HS— and one or more byproducts containing $Y_b$, wherein $X_a$ is one or more nucleophilic groups and $Y_b$ is an extracting group and wherein 'a' ranges from 1 to 30, preferably from 1 to 10 and wherein 'b' is 1 or 2, preferably 1. The byproduct is then separated from the derived polymer by conventional separation processes. Typically, an excess above the stoichiometric amount of the reagent used generally varies in the range of from 1.01:1 to 2:1, preferably in the range of from 1.01:1.2 moles of groups $X_a$ to moles of groups of the formula —S—(C=S)—. The excess amount of the reagent should be so chosen as to achieve an acceptable rate of reaction. The stoichiometric amount is more preferred.

The reagent having the formula $X_a$  $Y_b$ can be a low molecular weight compound reagent, a polymeric reagent, or a combination thereof. The low molecular weight compound reagent is preferred.

The 'a' in the low molecular weight compound reagent can be 1 or 2, or a mixture of the reagent compounds with the 'a' on average being in the range of 1 to 2. The nucleophilic group $X_a$ in the low molecular weight compound reagent can be a primary amino, secondary amino, sulfanyl, phosphinyl groups or a combination thereof when a mixture of the reagents is used. Primary amino group is preferred.

The extracting group $Y_b$ can be a reactive, ionic or ionizable group or a polymer moiety made by any polymerization process. The ionizable group is preferred. Y can be selected from the group consisting of alkenyl, trialkoxysilyl, carboxy (—$CO_2H$), carboxylate (—$CO_2^-$), tertiary amino (—$NR^v_3$), tertiary ammonium (—$N^+HR^v_3$), quaternary ammonium (—$N^+R^v_4$), tertiary phosphine (—$PR^v_3$), tertiary phosphonium (—$P^+HR^v_3$), quaternary phosphonium (—$P^+R^v_4$), dihydroxyphosphoryl [—$P(O)(OH)_2$], hydroxyoxidophosphoryl [—$P(O)(OH)(O^-)$—], phosphonato [—$P(O)(O^-)_2$], hydroxyphosphoryl [—$PR^v(O)(OH)$], alkoxy or aryloxyphosphonato [—$P(OR^v)(O)(O^-)$], alkyl or arylphosphinato [—$PR^v(O)(O^-)$], hydroxysulfonyl (—$S(O)_2(OH)$), sulfonato (—$S(O)_2(O^-)$), hydroxysulfinyl (—$S(O)(OH)$), sulfinato (—$S(O)(O^-)$), 2-, 3- or 4-pyridinyl, 2-, 3- or 4-pyridinium, oligo(alkylene oxide), a polymer chain, a polymer moiety of a crosslinked styrene-divinyl benzene particle, a polymer moiety of a crosslinked acrylic particle, a polymer moiety of a microgel, and a polymer moiety of a silica particle; wherein $R^v$ is substituted or unsubstituted alkyl or aryl.

The ionizable group can be a tertiary amino group or a carboxyl group. The tertiary amino group is preferred. In a preferred class of the reagent compounds, $Y_b$ is a tertiary amine and $X_a$ is a acyclic or cyclic aliphatic primary or secondary amine. Some preferred reagent compounds of this class are 3-dimethylamino-1-propylamine, 2-(dimethylamino)ethylamine and 4-amino-2,2,6,6-tetramethylpiperidine. The more preferred reagent is 2-(dimethylamino)ethylamine.

The reagent can be a polymeric reagent where 'a' can range from 5 to 100, preferably from 5 to 20 and 'b' is 1 or 2, preferably 1 and wherein the extracting group $Y_b$ is the polymer moiety, which is described below. In this case the group $Y_b$ can be referred to as a solid or polymer support.

The polymer moiety is chosen for ease of separation and for being insoluble or for becoming insoluble in the medium upon reaction. The polymer moiety used as the extracting group $Y_b$ can be derived from a styrenic polymer, acrylic polymer or an inorganic material such as a silica particle. A preferred styrenic polymer is a copolymer polymerized from a monomer mixture comprising divinylbenzene and styrene. Typically, the ratio of divinylbenzene to styrene is in the range of from 0.1:100 to 10:100, preferably in the range of from 1:100 to 5:100. Examples of such polymeric moieties are Wang or Merrifield resins. The group $X_a$ (preferably $NH_2$—) attached to the polymer moiety (P) of the polymeric reagent suitable for use in the present invention can be of the following formula:

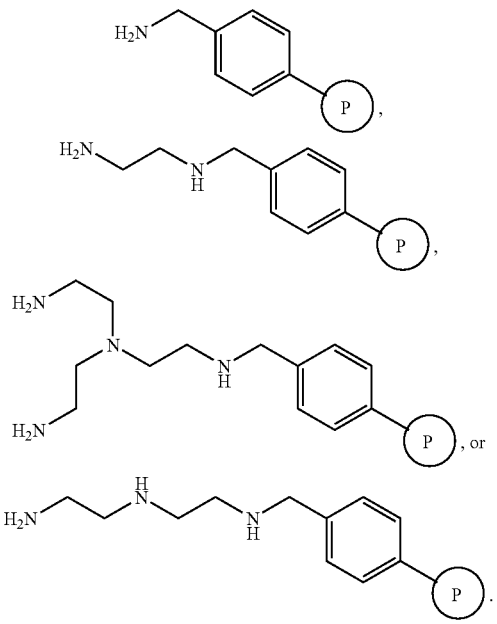

The polymer moiety when derived from the acrylic polymer can include acrylic polymers having a number average molecular weight ranging from 5,000 to 50,000, a Tg ranging from 10° C. to 80° C. wherein such acrylic polymers preferably contain moieties, such as hydroxyl, carboxyl, glycidyl and amino groups. Such acrylic polymers are known in the art and are polymers polymerized from a monomer mixture containing two or more of the following monomers:

Linear alkyl (meth)acrylates having 1 to 12 carbon atoms in the alkyl group; cyclic or branched alkyl (meth)acrylates having 3 to 12 carbon atoms in the alkyl group, such as isobornyl (meth)acrylate; hydroxy alkyl (meth)acrylates having 1 to 4 carbon atoms in the alkyl group, such as glycidyl (meth)acrylate; hydroxy amino alkyl (meth)acrylates having 1 to 4 carbon atoms in the alkyl group. The monomer mixture can contain also styrene, alpha methyl styrene, vinyl toluene, (meth)acrylonitrile (meth)acryl amides, (meth)acrylic acid, and trimethoxysilylpropyl (meth)acrylate.

The polymer moiety may also be a crosslinked particle or microgel such as those described in WO0002939A1 or WO0177198A1 which is functionalized with amino or thiol groups.

The polymer moiety which is an inorganic material can be a silica particle which is functionalized with amino or thiol groups.

Polymers with SH groups may undergo side reactions such as oxidation to form disulfides and/or thiolactonization in the case of acrylic polymers.

If desired, the starting polymer in the aforedescribed contacting step can be concurrently contacted with a reducing agent such as from a bisulfite salt preferably sodium bisulfite ($Na_2S_2O_4$); tetraalkylammonium bisulfite, preferably tetraethylammonium bisulfite; a thiosulfate salt preferably sodium thiosulfate ($Na_2S_2O_3$); a tertiary phosphine or its salt, preferably tris(2-carboxyethyl)phosphine hydrochloride, or ascorbic acid of the following formula:

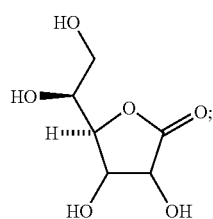

an ascorbate salt, preferably of the following formula:

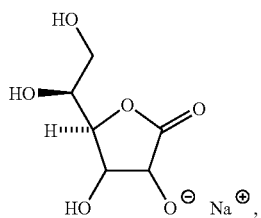

or a combination thereof. The amount of reducing agent added can typically vary in the range of from 0.1 to 1.0 molar equivalent of the reagent.

It is desirable to select the reagent compound or the polymeric reagent in accordance with the particular polymer architecture of the starting polymer to avoid undesired reactions between $X_a$ or $Y_b$ groups and various functionalities present in the starting polymer. For example if the starting polymer comprises acid functionalities, such as those derived from acrylic acid, methacrylic acid, and styrenesulfonic acid, the amine functionality in the reagent as $X_a$ or $Y_b$ should generally be avoided. For example, if the starting polymer comprises tertiary amine functionality, such as those derived from diethylaminoethyl acrylate or diethylaminoethyl methacrylate, an acid functionality in the reagent as $X_a$ or $Y_b$ should generally be avoided. It should be further noted that the reagents which contain multiple primary or secondary amine groups are potentially disadvantageous. For example, ethylenediamine when used with trithiocarbonate RAFT agents, i.e., when Z is alkylthio in the aforedescribed formula I, could act as a coupling agent. However, such reagents containing multiple primary or secondary amine groups can be used in the process of the present invention provided the reaction conditions and, in particular, the concentration of the reagents are selected in a way to avoid unwanted side reactions. For example by using the reagent $X_a$ ～～～ $Y_b$ in large excess, generally ranging from two-fold to ten-fold excess.

The following scheme illustrates that the process of the present invention by which the undesired sulfur component from the starting polymer can be removed for the case where a=b=1. R is a polymer chain.

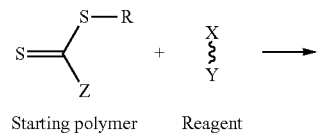

Starting polymer     Reagent

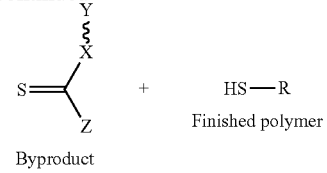

Depending upon the nature of the starting polymer and the reagent being used, the foregoing contacting step can be conducted at ambient temperature or preferably at reaction temperatures ranging from 15° C. to 100 C. Preferably the mixture of the starting polymer and the reagent is also subjected to agitation to facilitate the reaction, preferably under an inert atmosphere, preferably of nitrogen or argon. Depending upon the nature of the starting polymer, the concentration of the reagent being used and the reaction temperature, the contacting step can be completed in 5 minutes to 24 hours.

The completion of the foregoing contacting step results in the byproduct containing the extracting group $Y_b$. If the byproduct is insoluble in the medium in which starting polymer is carried, it can be separated by conventional separation methods, such as filtering, flocculating, centrifuging, decanting, or a combination thereof. If the byproduct is soluble in the medium in which starting polymer is carried, it can be separated by conventional separation methods, such as solvent extracting, precipitating, adsorbing, ion exchanging, or a combination thereof. The resulting finished/derived polymer can be in the form of a solution, dispersion, precipitate or a combination thereof. Preferably, all of the —S—(C═S)— groups in the starting polymers are converted to (—SH) groups during the process of the present invention.

Generally, the derived polymer can have on average 1 to 6 (—SH) groups. If condensation polymers, such as polythiourethanes are desired, the finished polymer should preferably have on average 2 to 6 (—SH) groups. These polythiourethanes can be advantageously formulated as casting material for optical lenses and can be prepared by contacting the derived polymer having on average 2 to 6 (—SH) groups with a diisocyanate, such as toluene diisocyanate, m-xylylene diisocyanate, hexamethylene disocyanate, diphenylmethane diisocyanate or a polymer chain with isocyanate end groups preferably at a stoichiometric molar ratio of (—SH)/(—NCO) ranging from 0.8 to 1.2. Such a polythiourethane has been described in Application US20040171765A1. If desired, the derived polymer can be contacted with a diacid in the presence of a condensation catalyst or with a diacid chloride to form a polythioester. The derived polymers can also be oxidatively coupled to form new polymers containing disulfide linkages. The derived polymers can also be used in crosslinking reactions for example in the formation of crosslinked films, coatings, networks or microgels. For such applications when forming a crosslinked polymer the (—SH) groups in the derived polymer preferably range from 2 and 6. For these applications requiring linear polymers the derived polymer preferably has 2 (—SH) groups.

A composition that includes the derived polymer can be used in an automotive refinish coating composition, automotive OEM coating composition, compatibilizer, thermoplastic elastomer, dispersant, flocculant, surfactant, rheology control agent, additive used to modify the surface properties of bulk polymers and plastics, photoresist, engineering plastic, adhesive, sealant, paper coating composition and a printing ink.

The derived polymers containing (—SH) groups have a high affinity for transition metals and can be used to form an encapsulating layer for nanoparticles such as gold or cadmium selenide. They may also be used for surface modification.

The derived polymers containing (—SH) groups also be used as transfer agents in free radical polymerization to form block or segmented copolymers. For these applications the derived polymer preferably has between 1 and 6 (—SH) groups.

Polymers containing (—SH) groups also be used to produce polymers by the thiol-ene reaction. For these applications when forming a crosslinked polymer, the derived polymer preferably has between 2 to 6 (—SH) groups.

EXAMPLES

The following examples demonstrate the cleavage of thiocarbonylthio groups to thiol groups in the starting polymers.

Example 1

2-Phenylethyl dithiobenzoate (14.9 mg) (quartet at 5.2 ppm in proton NMR for S—C—H) and 2-(dimethylamino)ethylamine (8 µL, 20% molar excess) (triplets at 2.8 and 2.4 ppm in proton NMR) were added to $CDCl_3$ (0.7 mL) which was flushed with nitrogen. An immediate color change from orange to yellow was observed. NMR analysis showed essentially complete reaction after 1 hour to give N-(2-(dimethylamino)ethyl)benzothioamide (triplets at 3.9 ppm and 2.7 ppm for $CH_2$—$CH_2$) and 1-phenylethanethiol (multiplet at 4.2 ppm for S—C—H).

Example 2

S-cyanomethyl S'-dodecyl trithiocarbonate (15.1 mg) (triplet at 3.4 ppm for R—$CH_2$—S and singlet at 4.1 ppm for S—$CH_2$—CN in proton NMR) and 2-(dimethylamino)ethylamine (4.6 mg, 20% molar excess) were added to $CDCl_3$ (0.7 mL) which was flushed with nitrogen. An immediate color change from yellow to almost colorless was observed. NMR analysis showed the reaction was complete after 24 hours. The products were identified by NMR as dodecyl 2-(dimethylamino)ethylcarbamodithioate (triplets at 3.7, 3.2 and 2.5 ppm for the three $CH_2$'s) and mercaptoacetonitrile (singlet at 3.25 ppm for S—$CH_2$—CN)

Polymer End Group Removal

The following examples demonstrate the cleavage of thiocarbonylthio end groups of polymers to form thiol end groups.

Example 3

Preparation of S-poly(methyl methacrylate) S'-dodecyl trithiocarbonate (Mn 3400) [$(CH_3)_2C(CN)$—PMMA-SC(=S)$SC_{12}H_{25}$]. A solution of the RAFT agent $C_{12}H_{25}SC(S)SC(CN)(CH_3)_2$ (685 mg) and VAZO®88 (10.5 mg) in methyl methacrylate (7.0 mL) and benzene (3.0 mL) was degassed and heated at 90° C. for 6 hours. Removal of the volatiles under reduced pressure afforded a yellow polymer (5.3 g, 81% conversion) of Mn=3400 and Mw/Mn=1.18. The end-group protons on carbon next to sulfur [—SC(S)$SCH_2C_{11}H_{23}$] appeared at 3.2 ppm in the proton NMR.

The above polymer (34 mg) in $CDCl_3$ (0.6 mL) and 2-(dimethylamino)ethylamine (1.3 mg, 50% molar excess) in $CDCl_3$ (0.1 mL) transferred to nitrogen flushed NMR tube. A marked color reduction was observed. NMR analysis showed the end group was cleaved by the formation of dodecyl 2-(dimethylamino)ethylcarbamodithioate (see Example 2)

Example 4

Preparation of S-polystyrene S'-dodecyl trithiocarbonate (Mn 4480) [$CNCH_2$—PS—SC(=S)Ph]. A solution of RAFT agent $C_{12}H_{25}SC(S)SCH_2CN$ (584 mg), VAZO®88 (16 mg) in styrene (16.0 mL) and benzene (4.0 mL) was degassed and heated at 90° C. for 16 hours. Removal of the volatiles under reduced afforded a yellow polymer (8.4 g, 58% conversion) of Mn=4475 and Mw/Mn=1.06. The proton NMR showed the end-group proton [—CH(Ph)SC(S)S—] as a broad signal between 4.6 and 5.1 ppm and the methylene of the dodecyl group [—SC(S)$SCH_2C_{11}H_{23}$] at 3.25 ppm.

The above polymer (45 mg) in $CDCl_3$ (0.6 mL) and 2-(dimethylamino)ethylamine (0.88 mg, 50% molar excess) in $CDCl_3$ (0.1 mL) transferred to nitrogen flushed NMR tube. A marked color reduction was observed. NMR analysis showed that the end group was cleaved by the loss of the broad signal between 4.6 and 5.1 ppm and the formation of dodecyl 2-(dimethylamino)ethylcarbamodithioate (see Example 2)

Example 5

Preparation of S-poly(butyl acrylate) S'-dodecyl trithiocarbonate ($NCCH_2$—PBA-SC(=S)$SC_{12}H_{25}$) (Mn 3100). A solution containing n-butyl acrylate (6.0 mL), the RAFT agent $C_{12}H_{25}SC(=S)SCH_2CN$ (400 mg), VAZO®64 (2.2 mg) and benzene (4.0 mL) was degassed and heated at 60° C. for 5 hours. Removal of the volatiles under reduced pressure provided a yellow polymer (3.4 g, 63% conversion) of Mn=3080 and Mw/Mn=1.09. The proton NMR of the polymer showed the presence of protons on carbon next to sulphur at 4.8 ppm [—CH(COOBu)SC(S)S—] and 3.3 ppm [—SC(S)$SCH_2C_{11}H_{23}$].

The above polymer (31 mg) in $CDCl_3$ (0.6 mL) and 2-(dimethylamino)ethylamine (1.3 mg, 50% molar excess) in $CDCl_3$ (0.1 mL) transferred to nitrogen flushed NMR tube. A color change from yellow to almost colorless was observed. NMR analysis showed the end group was cleaved by the disappearance of the signal at 4.8 ppm and the formation of dodecyl 2-(dimethylamino)ethylcarbamodithioate (see Example 2)

The following example shows that the dithiocarbamate by-product is ready removed by acid extraction.

Example 6

Preparation of S-poly(methyl acrylate) dithiobenzoate (Ph$(CH_3)$CH—PMA-SC(=S)Ph) (Mn 2600). A solution containing n-methyl acrylate (8.0 mL), the RAFT agent Ph$(CH_3)$CHSC(=S)Ph (100 mg), VAZO®64 (3 mg) and benzene (12.0 mL) was degassed and heated at 60° C. for 16 hours. Removal of the volatiles under reduced pressure provided a pink polymer of Mn=2600 and Mw/Mn=1.06. The proton NMR of the polymer showed the end group proton as a multiplet at 4.8 ppm and the two aromatic protons ortho to the C=S at 7.95 ppm.

S-poly(methyl acrylate) dithiobenzoate ($M_n$ 2600, 26 mg) in $CDCl_3$ (0.6 mL) and 2-(dimethylamino)ethylamine (0.88 mg, 50% molar excess) in $CDCl_3$ (0.1 mL) transferred to a nitrogen flushed NMR tube. A color change from pink to almost colorless was observed. NMR analysis showed the end group was cleaved by the formation of N-(2-(dimethylamino)ethyl)benzothioamide and loss of the signal at 4.8 ppm. The reaction mixture was extracted with dilute acid and water and the organic extract dried over anhydrous $MgSO_4$ and evaporated. NMR analysis of the polymer showed that the byproduct N-(2-(dimethylamino)ethyl)benzothioamide (see example 1) had been completely removed.

These and other features and advantages of the present invention will be more readily understood, by those of ordinary skill in the art, from a reading of the following detailed description. It is to be appreciated those certain features of the invention, which are, for clarity, described above and below in the context of separate embodiments, can also be provided in combination in a single embodiment. Conversely, various features of the invention that are, for brevity, described in the context of a single embodiment, can also be provided separately or in any sub-combination. In addition, references in the singular can also include the plural (for example, "a" and "an" can refer to one, or one or more) unless the context specifically states otherwise.

What is claimed is:

1. A process for removing one or more groups of the formula —S—(C=S)— from a starting polymer, which is in the form of a solution, dispersion, or a combination thereof, said process comprising:

contacting said starting polymer with one or more reagents to form at least (i) a derived polymer absent one or more groups of the formula —S—(C=S)—, and (ii) a byproduct, said one or more reagents selected from the group consisting of 2-(dimethylamino)ethylamine, 3-dimethylamino-1-propylamine, 4-amino-2,2,6,6-tetramethylpiperidine, and a reagent of the formula:

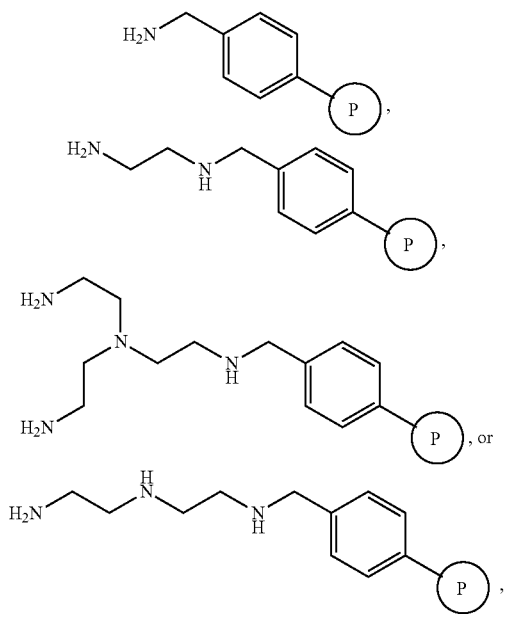

wherein

in said formula is a polymer moiety; and
separating said byproduct from said derived polymer.

2. The process of claim 1 wherein at least a stoichiometric amount of said reagent is contacted with said starting polymer.

3. The process of claim 1 wherein said starting polymer is a homopolymer, random, statistical, alternating or gradient copolymer, block polymer, star polymer, graft copolymer, dendritic or hyperbranched copolymer, microgel, or a combination thereof.

4. The process of claim 1 wherein said separating step comprises one or more of filtering, solvent extracting, precipitating, flocculating, adsorbing, or ion exchanging said byproduct from said derived polymer.

5. The process of claim 1 wherein said polymer moiety is derived from a styrenic polymer or an acrylic polymer.

6. The process of claim 5 wherein said styrenic polymer is a copolymer polymerized from a monomer mixture comprising divinylbenzene and styrene.

7. The process of claim 1 wherein in said contacting step said starting polymer is concurrently contacted with a reducing agent selected from the group consisting of a bisulfate salt, a thiosulfate salt, a tertiary phosphine, a tertiary phosphine salt, ascorbic acid, ascorbate salt and a combination thereof.

8. The process of claim 7 wherein said thiosulfate salt is $Na_2S_2O_4$.

9. The process of claim 7 wherein said ascorbate salt is sodium ascorbate.

10. The process of claim 7 wherein said tertiary phosphine salt is tris(2-carboxyethyl)phosphine hydrochloride.

11. The process of claim 1 wherein said derived polymer is in the form of a solution, dispersion, precipitate or a combination thereof.

12. The process of claim 11 wherein said derived polymer has 1 to 6 thiol (—SH) groups.

13. The process of claim 12 wherein said starting polymer has a GPC number average molecular weight in the range of 500 to 100,000.

14. The process of claim 12 wherein said starting polymer has a polydispersity in the range of 1.05 to 3.0.

15. The process of claim 11 wherein said derived polymer has 2 to 6 thiol (—SH) groups.

16. The process of claim 15 further comprising contacting said derived polymer with a di-isocyanate to form polythiourethane.

17. The process of claim 1 wherein said starting polymer is polymerized from a monomer mixture comprising one or more vinyl monomers having the formula:

$$H_2C=C\underset{L}{\overset{M}{\big|}}$$

where L is selected from the group consisting of hydrogen, halogen, and substituted or unsubstituted $C_1$-$C_4$ alkyl;

where M is selected from the group consisting of hydrogen, R''', $CO_2H$, $CO_2R'''$, COR''', CN, $CONH_2$, $PO(OR''')_3$, CONHR''', $CONR'''_2$, $O_2CR'''$, OR''', and halogen, wherein R''' is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl; said substituents being independently selected from the group consisting of hydroxy, OR''', $CO_2H$, $O_2CR'''$, $CO_2R'''$, $C_1$-$C_{22}$ alkyl, $C_6$-$C_{18}$ aryl, =O(oxo), $C_6$-$C_{18}$ acyl, SO₃H, sulfonate, cyano, $C_3$-$C_{66}$ trialkoxysilyl, $C_3$-$C_{66}$ trialkylsilyl, halo, $C_2$-$C_{44}$ dialkylamino, amido and a combination thereof; and a RAFT agent and a source of initiating radicals.

18. The process of claim 17 wherein said monomer mix further comprises maleic anhydride, N-alkylmaleimide, N-arylmaleimide, dialkyl fumarate, a cyclopolymerizable monomer, a ring-opening monomer or a combination thereof.

19. The process of claim 17 wherein said RAFT agent is of the formula:

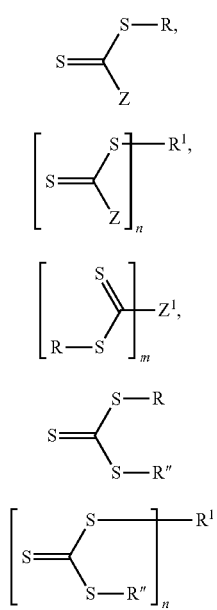

or a combination thereof;

wherein R and $R^1$ are free radical leaving groups; and wherein,

R is selected from the group consisting of unsubstituted or substituted alkyl, unsubstituted or substituted alkenyl, unsubstituted or substituted $C_2$ to $C_{18}$ alkynyl, $C_3$ to $C_{22}$ substituted or unsubstituted cycloalkyl, $C_4$ to $C_{22}$ substituted or unsubstituted cycloalkenyl, $C_6$ to $C_{18}$ unsubstituted or substituted aryl, unsubstituted or substituted saturated heterocyclic ring, $C_5$ to $C_{18}$ unsubstituted or substituted unsaturated heterocyclic ring, $C_4$ to $C_{18}$ unsubstituted or substituted aromatic heterocyclic ring, $C_1$ to $C_{18}$ unsubstituted or substituted alkylthio group, and a first polymer chain having a number average degree of polymerization in the range of 5 to 1000;

wherein R" is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl;

Z is selected from the group consisting of H, chloro, fluoro, unsubstituted or substituted alkyl, $C_6$ to $C_{18}$ unsubstituted or substituted aryl, unsubstituted or substituted heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, cyano, $C_2$ to $C_{18}$ dialkyl-phosphonato, diaryl-phosphonato, $C_1$ to $C_{18}$ dialkyl-phosphinato, diaryl-phosphinato, $C_1$-$C_{22}$ trialkoxysilyl, $C_1$-$C_{22}$ trialkylsilyl and a second polymer chain having a number average degree of polymerization in the range of 5 to 1000;

$R^1$ is an n-valent moiety derived from R;

$Z^1$ is an m-valent moiety derived from a species selected from the group consisting of unsubstituted or substituted alkyl, unsubstituted or substituted aryl and a third polymer chain having a number average degree of polymerization in the range of 5 to 1000 wherein the connecting moieties in said polymer chain are selected from the group consisting of $C_1$ to $C_{18}$ aliphatic carbon, aromatic carbon, oxygen, sulfur and a combination thereof;

n and m are integers that interpedently range from 1 to 6; and wherein the substituents for the substituted groups for R, $R^1$, R", Z and $Z^1$ are independently selected from the group consisting of hydroxy, tertiary amino, halo, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

* * * * *